3,799,968
N-ARYL-N-FLUOROALKYLSULFONYL
CARBAMATES
Joseph K. Harrington, Edina, and Jerry E. Robertson,
North Oaks, Minn., assignors to Minnesota Mining &
Manufacturing Company, St. Paul, Minn.
No Drawing. Filed Apr. 8, 1968, Ser. No. 719,748
Int. Cl. C07c 143/74
U.S. Cl. 260—470                 9 Claims

ABSTRACT OF THE DISCLOSURE

Substituted and unsubstituted N-acylperfluoroalkane-sulfonanilides which have utility as herbicides or plant growth regulators.

BACKGROUND AND SUMMARY

Sulfonamides are known to the art for use as plant growth regulators. N-acylperfluoroalkanesulfonanilides of the type included within the scope of the invention have not been previously described.

DETAILED DESCRIPTION

This invention provides a novel class of compounds with a wide range of plant growth regulative properties which is represented by the following general formula:

Formula I

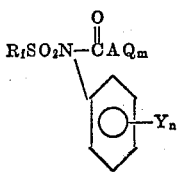

in which $R_f$ is a straight or branched chain perfluoroalkyl radical having from 1 to 4 carbon atoms; A is a connecting group selected from the group consisting of a single carbon to carbon bond, —O—, —S— and —N<; Q is a hydrocarbon group containing up to 14 carbon atoms, $m$ is 1 or 2, according to the available valences of A, and when $m$ is 2, the two Q groups may be the same or different, $n$ is zero to 5, and Y is selected from the group consisting of halogen, mercapto, lower alkylmercapto, lower perfluoroalkyl, lower acyl, alkylamino, amino, lower alkoxy, lower alkyl, lower alkylamido, carbalkoxy, lower alkylsulfinyl, lower alkylsulfonyl, cyano, nitro, lower alkenyl, sulfonamido and phenyl, and substituted phenyl.

Q can be acyclic (straight chain or branched) or cyclic (aromatic or aliphatic) or a mixture of acyclic and cyclic structures.

A preferred class of compounds within the scope of the invention has the Formula I in which $R_f$, Q and $n$ are as defined above and Y is selected from the group consisting of halogen, lower perfluoroalkyl, lower alkyl, lower alkoxy, alkylmercapto, alkylsulfinyl and alkylsulfonyl, wherein the alkyl groups are straight or branched chain and contain from 1 to 4 carbon atoms. When the phenyl ring is polysubstituted, the substituents Y may be the same or different.

The compounds of the invention are prepared by the reaction of a perfluoroalkyl sulfonanilide of the formula:

Formula II

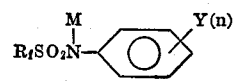

with a carbonyl halide or anhydride of the formula:

Formula III

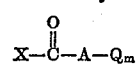

In these formulae, $R_f$, Y, A, Q and $m$ are as previously defined. M represents hydrogen or an alkali metal, such as sodium or potassium, or a tertiary ammonium cation, such as triethylammonium, pyridinium or N,N-dimethyl-anilinium, and $x$ represents a halogen, or the residue of an anhydride, i.e.

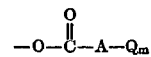

A wide variety of acylating agents of Formula III can be used in preparing the compounds of the invention, including acyl halides or anhydrides, haloformates, thiol haloformates, carbamyl halides and the like. These compounds are either available directly or, in the case of certain chloroformates or thiol chloroformates, are easily prepared from phosgene and the appropriate alcohol or thiol.

Exemplary of suitable acylating agents of Formula III known to the art are:

acetic anhydride,
butyryl chloride,
N,N-dimethyl carbamoyl chloride,
phenylthiochloroformate,
isopropyl chloroformate,
N-methyl-N-phenyl carbamoyl chloride,
β-naphthoyl chloride,
ethylthiochloroformate,
lauroyl chloride,
methyl chloroformate,
carbobenzoxy chloride,
perfluoroacetic anhydride,
n-octyl chloroformate, and the like.

In carrying out this condensation, (usually at 0 to 150° C.) substantially equivalent quantities of the reactants are employed usually in suitable aprotic solvent, e.g. bis(2-methoxyethyl) ether, acetonitrile, acetone, methyl ethyl ketone, N,N-dimethylformamide, benzene, toluene, chloroform and the like.

When M is hydrogen, the reaction is preferably carried out in the presence of a proton acceptor, e.g., alkali metal salts, such as sodium or potassium carbonates, bicarbonates and acetates and also tertiary amines, such s triethylamine, pyridine and N,N-dimethylaniline.

The precursor fluorocarbonsulfonanilides are prepared by reaction of the corresponding fluorocarbonsulfonic anhydride or fluorocarbonsulfonyl halide with a solution of the aniline and a sufficient quantity of an acid acceptor in an inert organic solvent as follows:

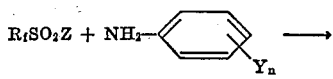

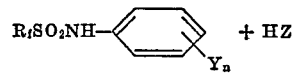

where Z is halogen, conveniently fluorine or chlorine or $R_fSO_3—$. Among the suitable solvents are glyme, benzene, chloroform, methylene chloride and the like. The reaction is advantageously carried out at $-15°$ C. to $+150°$ C. but this may be raised or lowered if desired. Also if desired, the reaction can be carried out in a pressure vessel.

Suitable perfluoroalkylsulfonyl anhydrides and halides (e.g. chlorides and fluorides) for use in these procedures are known to the art (e.g. see U.S. Pat. 2,732,398). The precursor anilines are described in the general chemical literature or are otherwise known to those skilled in the art. These precursor anilines are generally known compounds, or, in some cases, can be prepared from the corresponding known substituted nitrobenzenes by reduction.

The plant growth regulating activity of representative compounds of the invention was determined using screening tests against experimental plantings. Both pre- and post-emergence activity were determined in a direct screen against selected weed species. The following weed mixtures were used for the tests Grasses:
    Giant foxtail (*Setaria faberii*)
    Barnyard grass (*Echinochloa crusgalli*)
    Crabgrass (*Digitaria ischaemum*)
    Quackgrass (*Agropyron repens*)
Broadleaves:
    Pigweed (*Amaranthus retroflexus*)
    Purslane (*Portulaca oleracea*)
    Wild mustard (*Brassica kaber*)
    Wild morning glory (*Convolvulus arvensis*)

The test chemicals were dissolved in a small amount of acetone or other suitable solvent and then diluted with water to give a concentration of 2000 p.p.m. From this concentration aliquots were diluted to give a final concentration of 500 p.p.m. Eighty ml. of this solution were added to a 6-inch pot containing the weed seeds to give a concentration equivalent to 20 lb./acre.

To assess post-emergence activity, the same weed mixtures were allowed to grow from 2 to 3 weeks until the grasses were approximately 1 to 3 inches and the broadleaves 1½ inches tall. They were sprayed for approximately 10 seconds or until good wetting of the leaf surfaces occurred with a 2000 p.p.m. solution as described above.

The following compounds of the invention were all active at 20 pounds per acre or 2000 p.p.m. or less:

N-ethoxycarbonyl-2,4-difluorotrifluoromethanesulfonanilide,
N-ethoxycarbonyl-2,4-dichlorotrifluoromethanesulfonanilide,
N-ethoxycarbonyl-4-methylthiotrifluoromethanesulfonilide,
N-ethoxycarbonyl-3-trifluoromethyltrifluoromethanesulfonanilide,
N-ethoxycarbonyl-4-acetyltrifluoromethanesulfonanilide,
N-octyloxycarbonyl-2,4-dichlorotrifluoromethanesulfonanilide,
N-octyloxycarbonyl-2,4-difluorotrifluoromethanesulfonanilide,
N-lauroyl-2,4-difluorotrifluoromethanesulfonanilide,
N-lauroyl-2,4-dichlorotrifluoromethanesulfonanilide,
N-benzoyl-2,4-dichlorotrifluoromethanesulfonanilide,
N-ethylthiocarbonyl-2,4-dichlorotrifluoromethanesulfonanilide,
N-acetyl-2,4-dichlorotrifluoromethanesulfonanilide,
N-acetyl-2,4-difluorotrifluoromethanesulfonanilide,
N-methoxycarbonyl-2,4-difluorotrifluoromethane sulfonanilide, and
N-benzoyltrifluoromethanesulfonanilide.

Other compounds of the invention are active when applied at greater or smaller rates of application. It will be appreciated that not all of the compounds of the invention are equally active.

For application to plants, the compounds can be finely divided and suspended in any of the usual aqueous media. In addition, spreading agents, wetting agents, sticking agents or other adjuvants can be added as desired. Dry powders, as such or diluted with inert materials such as diatomaceous earth, can likewise be used as dusts for this purpose. The preparations are coated on the plants or the ground is covered when preemergence control is desired. Application is made with the usual sprayers, dust guns and the like. Application rates are at 20–30 lbs./acre as a rule of thumb, but may be increased or reduced according to individual circumstances of use.

Preparation of precursor sulfonanilides

The following examples more specifically illustrate the compounds of the invention and the process for their preparation. The preparation of a number of the precursors of the compounds of the invention and a method for their preparation from primary arylamines and perfluoroalkylsulfonyl halides and anhydrides are described. All parts by weight unless otherwise specified in these and the other specific examples. The examples shown here and elsewhere in this specification are not to be construed as limiting the scope of the invention in any way.

EXAMPLE 1

Preparation of 4-chlorotrifluoromethanesulfonanilide

A 500 ml., three-necked flask fitted with a mechanical stirrer, condenser, internal thermometer, addition funnel and nitrogen sweep was charged with 31.9 g. (0.25 mole) of 4-chloroaniline, 25.3 g. (0.25 mole) of triethylamine and 300 ml. of chloroform. Trifluoromethane sulfonic anhydride was added slowly at room temperature, and the reaction mixture was heated to reflux temperature for a few hours. The reaction mixture was poured into aqueous 10 percent sodium hydroxide and shaken. Separation of the aqueous phase, followed by acidification with hydrochloric acid, afforded a white solid which was recrystallized from petroleum ether to give analytically pure product, M.P. 50.5–51.5° C.

*Analysis.*—Calculated for $C_7H_5ClF_3NO_2S$ (percent): C, 32.1; H, 1.9. Found (percent): C, 32.4; H, 1.9.

EXAMPLE 2

Preparation of 2,4,6-trichlorotrifluoromethanesulfonanilide

Sodium naphthalene was prepared from 12.8 g. (0.1 mole) of naphthalene, 2.3 g. (0.1 g. atom) of sodium and 200 ml. of tetrahydrofuran. Thereafter, 19.6 g. (0.1 mole) of 2,4-6-trichloroaniline were added under nitrogen at ice bath temperature. The resulting brown mixture was transferred under nitrogen to a nitrogen-purged autoclave and charged with trifluoromethanesulfonyl fluoride (15.2 g., 0.1 mole). The mixture was heated at 50° C. for 20 hours. Tetrahydrofuran was removed, and the black mixture was taken up in dichloromethane. The organic mixture was filtered and extracted with cold, dilute potassium hydroxide. The separated aqueous layer was acidified with hydrochloric acid to give an oily solid. Trituration with cold petroleum ether followed by sublimation gave glistening white crystals, M.P. 106–107.5° C.

*Analysis.*—Calculated for $C_7H_3Cl_3F_3NO_2S$ (percent): C, 25.6; H, 0.9; N, 4.3. Found (percent): C, 25.5; H, 1.1; N, 4.3.

According to the general procedure described in detail in Examples 1 and 2, using appropriately substituted anilines and perfluoroalkyl sulfonyl halides, the following compounds were prepared:

| Example number | Compound | Melting point (uncorrected in °C.) |
|---|---|---|
| 3 | 2,4-difluoroperfluoro-n-butanesulfonanilide | 39.5–40.5 |
| 4 | 2-fluorotrifluoromethanesulfonanilide | 65.5–67.5 |
| 5 | 3-fluorotrifluoromethanesulfonanilide | 38–40 |
| 6 | 4-fluorotrifluoromethanesulfonanilide | 60.5–62.5 |
| 7 | 2-chlorotrifluoromethanesulfonanilide | 75.5–76.5 |
| 8 | 3-chlorotrifluoromethanesulfonanilide | 76–77 |
| 9 | 4-chloroperfluoro-n-butylsulfonanilide | 76–78 |
| 10 | 4-bromotrifluoromethanesulfonanilide | 56.5–58 |
| 11 | 2-bromotrifluoromethanesulfonanilide | 73.5–75.5 |
| 12 | 3-bromotrifluoromethanesulfonanilide | 79–80.5 |
| 13 | 3-iodotrifluoromethanesulfonanilide | 73–75 |
| 14 | 4-iodotrifluoromethanesulfonanilide | 73–75 |
| 15 | 3-trifluoromethyltrifluoromethanesulfonanilide | 32–34 |
| 16 | 4-trifluoromethyltrifluoromethanesulfonanilide | 73.5–75 |
| 17 | 2-chloro-5-trifluoromethyltrifluoromethanesulfonanilide | 53–54 |
| 18 | 3,5-dichloro-4-aminotrifluoromethanesulfonanilide | 120–121.5 |
| 19 | 2,4,5-trichlorotrifluoromethanesulfonanilide | 106–107 |
| 20 | 2,3,5,6-tetrafluorotrifluoromethanesulfonanilide | 93–95 |
| 21 | 2,4-difluorotrifluoromethanesulfonanilide | 64–65.5 |
| 22 | 3,4-dichlorotrifluoromethanesulfonanilide | (¹) |
| 23 | 2,3-dichlorotrifluoromethanesulfonanilide | 83–87 |
| 24 | 2,5-dichlorotrifluoromethanesulfonanilide | 71–73 |
| 25 | 3,5-dichlorotrifluoromethanesulfonanilide | 76.5–79 |
| 26 | 2,4-dichlorotrifluoromethanesulfonanilide | 89.5–90.5 |
| 27 | 2,4-dibromotrifluoromethanesulfonanilide | 106–107 |
| 28 | 2-nitrotrifluoromethanesulfonanilide | 68.5–69 |
| 29 | 3-nitrotrifluoromethanesulfonanilide | 64–66 |
| 30 | 4-nitrotrifluoromethanesulfonanilide | (²) |
| 31 | 2,4-dinitrotrifluoromethanesulfonanilide | 107–108 |
| 32 | 2-nitro-4-chlorotrifluoromethanesulfonanilide | (³) |
| 33 | 2-chloro-4-nitrotrifluoromethanesulfonanilide | 87–88 |
| 34 | 3-methoxytrifluoromethanesulfonanilide | 63–65 |
| 35 | 4-methoxytrifluoromethanesulfonanilide | 38–41 |
| 36 | 3-ethoxytrifluoromethanesulfonanilide | 48–48.5 |
| 37 | 4-ethoxytrifluoromethanesulfonanilide | 48–49 |
| 38 | 2,5-dimethoxytrifluoromethanesulfonanilide | 63–65 |
| 39 | 3,4-diethoxytrifluoromethanesulfonanilide | 78.2–79.2 |
| 40 | 2,4-dimethoxy-5-chlorotrifluoromethanesulfonanilide | 109.5–110 |
| 41 | 3-methylthiotrifluoromethylsulfonanilide | 36–37.5 |
| 42 | 4-methylthiotrifluoromethylsulfonanilide | 58–60 |
| 43 | 3-methylsulfinyltrifluoromethylsulfonanilide ³ | 115–116 |
| 44 | 4-methylsulfinyltrifluoromethylsulfonanilide ³ | 142–143 |
| 45 | 3-methylsulfonyltrifluoromethylsulfonanilide ⁴ | 99–100 |
| 46 | 4-methylsulfonyltrifluoromethylsulfonanilide ⁴ | 166–166.5 |
| 47 | 4-aminotrifluoromethylsulfonanilide | 104.5–106 |
| 48 | 3-acetamidotrifluoromethylsulfonanilide | 159–161 |
| 49 | 4-acetamidotrifluoromethylsulfonanilide | 152.5–154 |
| 50 | 2,4-difluoroperfluoroisopropylsulfonanilide | 67.5–68.5 |
| 51 | 4-methylthioperfluoro-n-butylsulfonanilide | 89–90.5 |
| 52 | 2,3,4,5,6-pentafluorotrifluoromethanesulfonanilide | 68–69 |
| 53 | 4-chloro-2-methyltrifluoromethanesulfonanilide | 88.8–90.2 |
| 54 | 4-chloro-2-trifluoromethyltrifluoromethanesulfonanilide | 66.5–67.5 |

¹ B.P. 135–145/mm.
² B.P. 150–151/.05 mm.
³ Red oil.
⁴ The synthesis of the mercaptosulfonanilide was followed by oxidation with one equivalent of hydrogen peroxide in acetone
⁵ The synthesis of the mercaptosulfonanilide was followed by oxidation with two equivalents of hydrogen peroxide in acetic acid.
⁶ Compound 30 was catalytically reduced using 5 percent palladium on charcoal.

Preparation of the N-acylated compounds of the invention

The following examples provide specific preparation of representative compounds of the invention utilizing the general method of reacting the acid anion of the precursor fluoroalkylsulfonanilide.

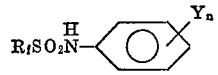

with various chloroformates, acyl halides, carbamyl chlorides or other acylating agents. The reactions were generally carried out at ambient temperature and pressure.

EXAMPLE 55

N-ethoxycarbonyl-2,4-difluorotrifluoromethane-sulfonanilide

To a stirred mixture of the dry sodium salt of 2,4-difluorotrifluoromethanesulfonanilide (49.5 g., 0.175 mole), about 1 gram of sodium carbonate, and dry acetone (150 ml.), is added ethyl chloroformate (19 g., 0.175 mole) dropwise, with ice bath cooling. On completion of the addition, the resulting mixture was stirred for 24 hours at room temperature, filtered and evaporated. The resulting oil was fractionated to purify it for analysis, B.P. 63–64° C./0.05 mm.

Analysis.—Calculated for $C_{10}H_8F_5NO_4S$ (percent): C, 36.0; H, 2.4. Found (percent): C, 36.1; H, 2.6.

EXAMPLE 56

N-ethoxycarbonyl-2,4-dichlorotrifluoromethane-sulfonanilide

The dry sodium salt of 2,4-dichlorotrifluoromethane-sulfonanilide (31.6 g., 0.10 mole), ethyl chloroformate (10.9 g., 0.10 mole) and dry acetone (75 ml.) were combined in a 200 ml. round bottom, condenser-equipped flask and heated to reflux temperature for 12 hours, and then allowed to stand two days. Sodium chloride was removed by suction filtration of the reaction mixture, and solvent was then removed using a rotary evaporator. The oil was distilled through a 10 inch Vigreaux column to give analytically pure product, B.P. 120–125° C./1 mm.

Analysis.—Calculated for $C_{10}H_8F_3Cl_2NO_4S$ (percent): C, 33.0; H, 2.2. Found (percent): C, 32.9; H, 2.3.

Following the general procedure of Examples 55 and 56, and substituting other acylating agents, the following exemplary compounds of the invention are obtained.

EXAMPLE 57

N-methoxycarbonyl-2,4 - difluorotrifluoromethanesulfonanilide, M.P. 63.5–65.5° C.

EXAMPLE 58

N-acetyl - 2,4 - difluorotrifluoromethanesulfonanilide, M.P. 50.5–51° C.

EXAMPLE 59
N-acetyl - 2,4 - dichlorotrifluoromethanesulfonanilide, M.P. 43.3–44.5° C.

EXAMPLE 60
N-octyloxycarbonyl - 2,4 - difluorotrifluoromethanesulfonanilide, B.P. 164–8° C./5 mm.

EXAMPLE 61
N-octyloxycarbonyl - 2,4 - dichlorotrifluoromethanesulfonanilide, B.P. 131–3° C./0.05 mm.

EXAMPLE 62
N-lauroyl - 2,4 - difluorotrifluoromethanesulfonanilide, M.P. 34.3–35.5° C.

EXAMPLE 63
N-lauroyl - 2,4 - dichlorotrifluoromethanesulfonanilide, M.P. 40–41.5° C.

EXAMPLE 64
N-benzoyl - 2,4-dichlorotrifluoromethanesulfonanilide, M.P. 84–85° C.

EXAMPLE 65
N-ethylthiocarbonyl - 2,4 - dichlorotrifluoromethanesulfonanilide, M.P. 58–59.5° C.

EXAMPLE 66
N-ethoxycarbonyl-4-methylthiotrifluoromethanesulfonanilide

To a stirred solution of the dry sodium salt of 4-methylthiotrifluoromethanesulfonanilide (15 g., 0.051 mole), a few grams of molecular sieves, and bis(2-methoxyethyl) ether (100 ml.) is added ethyl chloroformate (6.25 g., 0.058 mole) dropwise at room temperature. The mixture was stirred for two hours at room temperature and refluxed three additional hours. The solvent was evaporated under reduced pressure. The resulting solid was recrystallized twice from hexanebenzene to afford analytically pure product, M.P. 62.5–63.3° C.

*Analysis.*—Calculated for $C_{11}H_{12}F_3NO_4S_2$ (percent): C, 38.5; H, 3.5; N, 4.1. Found (percent): C, 38.6; H, 3.5; N, 4.2.

Following the general procedures of Examples 55, 56 and 66, and substituting other precursor sulfonanilides prepared as shown in Examples 1 to 54, the following exemplary compounds of the invention are obtained.

EXAMPLE 67
N-ethoxycarbonyl - 4 - chloroperfluorobutanesulfonanilide.

EXAMPLE 68
N-ethoxycarbonyl - 4 - chloroperfluoroethanesulfonanilide.

EXAMPLE 69
N-ethoxycarbonyl - 4 - chlorotrifluoromethanesulfonanilide.

EXAMPLE 70
N-ethoxycarbonyl - 3 - nitrotrifluoromethanesulfonanilide.

EXAMPLE 71
N-ethoxycarbonyl - 4 - acetyltrifluoromethanesulfonanilide.

EXAMPLE 72
N-ethoxycarbonyl - 3-trifluoromethyltrifluoromethanesulfonanilide.

EXAMPLE 73
N-ethoxycarbonyl - 3 - methylsulfinyltrifluoromethanesulfonanilide.

EXAMPLE 74
N-ethoxycarbonyl - 3 - ethoxytrifluoromethanesulfonanilide.

EXAMPLE 75
N-ethoxycarbonyl - 4 - chloro-2-methyltrifluoromethanesulfonanilide.

EXAMPLE 76
N-ethoxycarbonyl - 4 - chloro-2-trifluoromethyltrifluoromethanesulfonanilide.

The compounds of Examples 55 to 76 all exhibit inhibitory or regulatory effect upon growing green plants; or on plants prior to emergence from the soil.

What is claimed is:
1. A compound of the formula

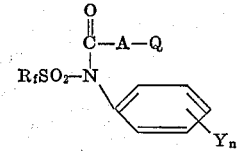

wherein $R_f$ is a perfluoroalkyl radical having 1 to 4 carbon atoms; A is —O—; Q is an alkyl radical having 1 to 14 carbon atoms; n is zero to 5, and Y is halogen, amino, nitro, lower alkylmercapto, lower perfluoroalkyl, lower alkanoyl, lower alkoxy, lower alkyl, lower alkylamido, lower alkylsulfinyl or lower alkylsulfonyl.

2. A compound according to claim 1 in which Y is halogen.

3. A compound according to claim 1, in which A—Q is —$OC_2H_5$.

4. A compound according to claim 1, in which A—Q is —$OC_8H_{17}$.

5. N-ethoxycarbonyl - 2,4 - dichlorotrifluoromethanesulfonanilide, according to claim 1.

6. N-ethoxycarbonyl - 2,4 - difluorotrifluoromethanesulfonanilide, according to claim 1.

7. N-ethoxycarbonyl - 4 - chlorotrifluoromethanesulfonanilide, according to claim 1.

8. N-ethoxycarbonyl - 3 - methylthiotrifluoromethanesulfonanilide, according to claim 1.

9. N-ethoxycarbonyl - 4 - trifluoromethyltrifluoromethanesulfonanilide, according to claim 1.

References Cited
UNITED STATES PATENTS

| | | | |
|---|---|---|---|
| 2,809,990 | 10/1957 | Brown | 260—534 |
| 3,183,266 | 5/1965 | Matzner | 260—556 |
| 3,663,708 | 5/1972 | Harrington et al. | 260—470 |
| 3,639,474 | 2/1972 | Harrington et al. | 260—470 |

LORRAINE A. WEINBERGER, Primary Examiner

J. F. TERAPANE, Assistant Examiner

U.S. Cl. X.R.

71—100, 103; 260—397.6, 397.7, 455 A, 465 D, 553 A, 553 D, 556 F